United States Patent
Prorock et al.

(10) Patent No.: US 8,180,670 B2
(45) Date of Patent: *May 15, 2012

(54) SELF-CHECKOUT COUPON SHARING

(75) Inventors: Thomas J. Prorock, Raleigh, NC (US);
David T. Rogers, Wake Forest, NC (US);
Julia P. Rockwell, Youngsville, NC (US)

(73) Assignee: International Business Machines Corporation, Armonk, NY (US)

( * ) Notice: Subject to any disclaimer, the term of this patent is extended or adjusted under 35 U.S.C. 154(b) by 705 days.

This patent is subject to a terminal disclaimer.

(21) Appl. No.: 12/132,473

(22) Filed: Jun. 3, 2008

(65) Prior Publication Data
US 2008/0243620 A1    Oct. 2, 2008

Related U.S. Application Data

(63) Continuation of application No. 10/769,970, filed on Feb. 2, 2004.

(51) Int. Cl.
*G06Q 30/00*      (2006.01)
(52) U.S. Cl. ........................................... 705/14.22
(58) Field of Classification Search ............. 705/14
See application file for complete search history.

(56) References Cited

U.S. PATENT DOCUMENTS

| | | | |
|---|---|---|---|
| 4,882,675 A | 11/1989 | Nichtberger et al. | |
| 5,115,888 A | 5/1992 | Schneider | |
| 5,128,520 A * | 7/1992 | Rando et al. ................. | 235/375 |
| 5,380,991 A | 1/1995 | Valencia et al. | |
| 5,471,669 A | 11/1995 | Lidman | |
| 5,494,136 A | 2/1996 | Humble | |
| 5,540,301 A | 7/1996 | Dumont | |
| 5,855,007 A | 12/1998 | Jovicic et al. | |
| 5,905,246 A | 5/1999 | Fajkowski | |
| 6,199,753 B1 | 3/2001 | Tracy et al. | |
| 6,363,355 B1 | 3/2002 | Morrison et al. | |
| 6,497,362 B2 | 12/2002 | Persky et al. | |
| 6,571,218 B1 | 5/2003 | Sadler | |
| 6,696,920 B1 * | 2/2004 | Goodwin et al. ............ | 340/5.91 |
| 6,837,428 B2 * | 1/2005 | Lee et al. ..................... | 235/383 |
| 2002/0010623 A1 | 1/2002 | McCollom et al. | |
| 2005/0131761 A1 * | 6/2005 | Trika et al. .................... | 705/14 |
| 2007/0156513 A1 * | 7/2007 | Mastrianni et al. ........... | 705/14 |

FOREIGN PATENT DOCUMENTS

GB      229028 A      9/1990

* cited by examiner

*Primary Examiner* — Alvin L Brown
(74) *Attorney, Agent, or Firm* — H. Barrett Spranggins; Thomas E. Tyson; Biggers & Ohanian, LLP

(57) ABSTRACT

The present invention is directed to a system for processing coupons by a self checkout system, where the self checkout system includes at least one self checkout station coupled to a server. In a first aspect, a self checkout system includes a server for managing the self checkout system and at least one self checkout station coupled to the server, where the self checkout station includes a scanner for scanning at least one item for purchase by a customer, a coupon reader for receiving a coupon from the customer, and a coupon manager. The coupon manager attempts to validate the coupon against the at least one item scanned by the customer, and if the coupon fails to validate, the coupon manager stores the coupon in a coupon pool at the server such that the stored coupon can be utilized at a subsequent sales transaction.

4 Claims, 4 Drawing Sheets

SELF-CHECKOUT COUPON SHARING

CROSS-REFERENCE TO RELATED APPLICATIONS

Under 35 USC §120, this application is a continuation application and claims the benefit of priority to U.S. patent application Ser. No. 10/769,970, filed Feb. 2, 2004, entitled "Method for Self-Checkout Coupon Sharing System", all of which is incorporated herein by reference.

FIELD OF THE INVENTION

The present invention relates to a Self Check Out system and more particularly to a system for processing coupons in a Self Check Out system.

BACKGROUND OF THE INVENTION

In the retail sales industry, a customer is able to pay for items at a Self Check Out (SCO) station without the aid of a checkout clerk. During operation, the customer typically scans each item across a scanner. When all items have been scanned, the SCO station aggregates the items, indicates the aggregate purchase price to the customer, and allows the customer to pay either at the SCO station or at a central payment area staffed by an employee. Although SCO stations are typically stationary structures, "mobile" SCO stations have been developed recently that allow the customer to self-check out on-the-fly. Such devices are well known in the art and will not be described further.

In addition to the described functionality, most SCO stations also provide a means for accepting paper coupons. Typically, such paper coupons offer discounts on items to encourage customers to purchase the items. The paper coupons are issued by the retailer or by the manufacturer of an item. The paper coupons are scanned by the SCO system, which then deducts the value of the coupons from the aggregate purchase price. While most SCO systems scan coupons, they differ as to how the coupons are then input into the system for accounting and processing purposes. Some SCO systems provide a slot into which the customer can insert the coupons. Nevertheless, a problem exists when the SCO system does not validate the coupon inserted into the slot against the coupon that was scanned during the sales transaction. If the customer inserts a different coupon, the customer can reuse the scanned coupon and the retailer cannot redeem the value of the coupon from the manufacturer.

Accordingly, what is needed is a system and method for processing paper coupons in a SCO system. The system should validate coupons against items scanned and should also provide a means for handling coupons that fail to validate such that customers and manufacturers/retailers who issue the coupons benefit. The present invention addresses such a need.

SUMMARY OF THE INVENTION

The present invention is directed to a method and system for processing coupons by a self checkout system, where the self checkout system includes at least one self checkout station coupled to a server. In a first aspect, the present invention includes receiving a coupon from a customer by one of the at least one self checkout stations, attempting to validate the coupon against at least one item scanned by the customer, and storing the coupon in a coupon pool at the server if the coupon fails to validate against the at least one item, such that the stored coupon can be utilized at a subsequent sales transaction. In a second aspect, a self checkout system includes a server for managing the self checkout system and at least one self checkout station coupled to the server, where the self checkout station includes a scanner for scanning at least one item for purchase by a customer, a coupon reader for receiving a coupon from the customer, and a coupon manager. The coupon manager attempts to validate the coupon against the at least one item scanned by the customer, and if the coupon fails to validate, the coupon manager stores the coupon in a coupon pool at the server such that the stored coupon can be utilized at a subsequent sales transaction.

DETAILED DESCRIPTION

The present invention relates to a Self Check Out (SCO) system and more particularly to a method and system for processing coupons by a SCO system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

According to a preferred embodiment of the present invention, the SCO system includes a retailer server and at least one SCO station coupled to the server. The SCO station includes a coupon reader, which receives and reads a paper coupon. A coupon manager in the station verifies the status of the coupon and then attempts to validate the coupon against any of the items scanned by the customer during the concurrent sales transaction. If the coupon fails to validate, the coupon manager allows the customer to deposit the unused coupon at the server in one of at least two collections or pools. One pool can be dedicated to the customer for his or her personal use. Another pool can be a global pool for use by any shopper. During a subsequent visit, the customer can apply the unused coupons in either the personal or global pool to items purchased. The resulting system benefits customers as well as manufacturers that sponsor the coupon promotion.

Figure 1:
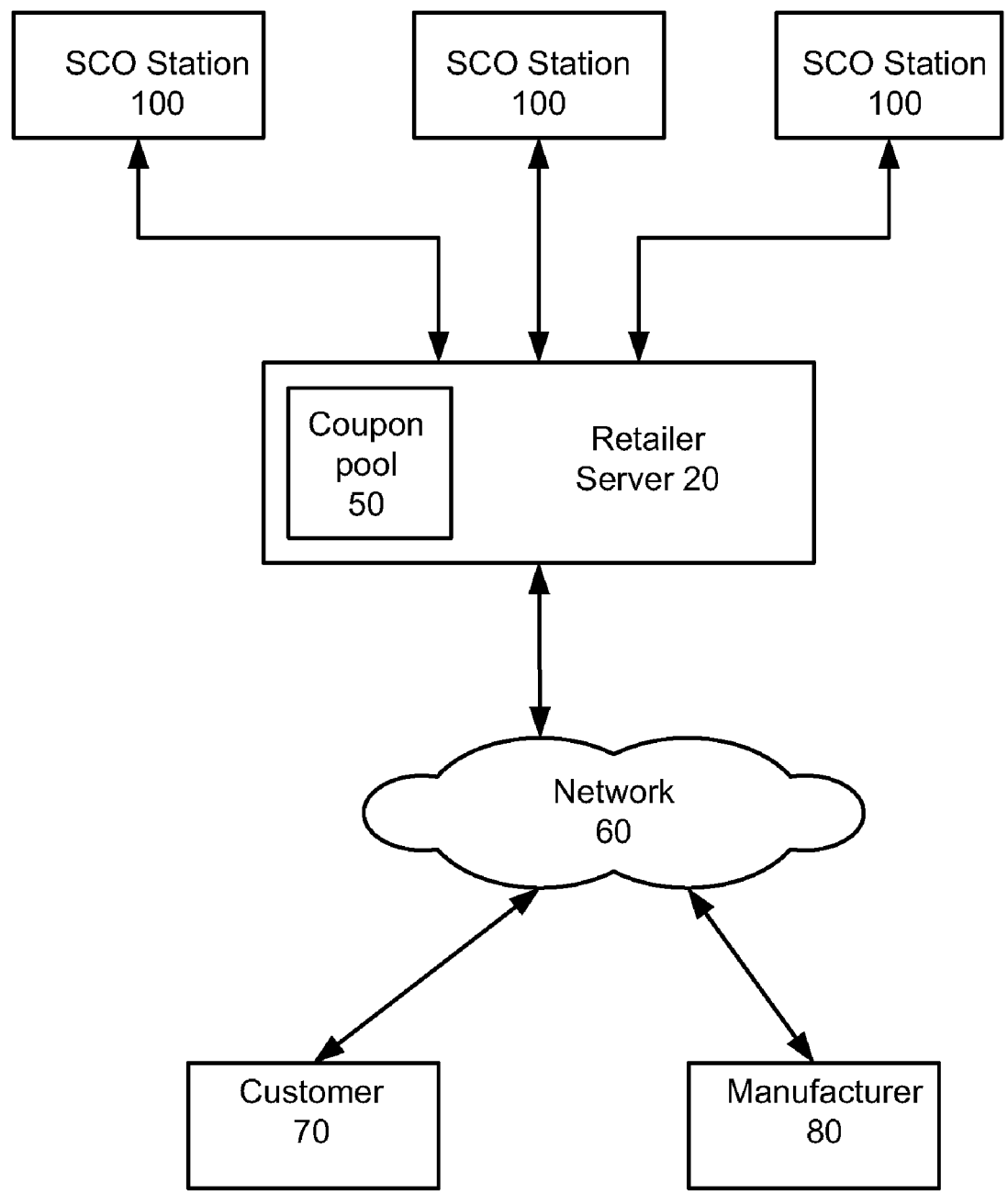
FIG. 1 is a block diagram of a Self Check Out system according to a preferred embodiment of the present invention.

FIG. 1 is a block diagram of an SCO system according to a preferred embodiment of the present invention. As is shown, several SCO stations 100 are coupled to a retailer server 20. The SCO stations 100 can be located in a single facility, such as a department store, or they can be located in different locations. Similarly, the retailer server 20 can be located on site with the SCO stations 100 or at another location. The SCO stations 100 and server 20 can communicate directly or via a wired or wireless private network, such as a LAN, WAN, intranet or internet, as is well known.

According to a preferred embodiment of the present invention, the retailer server 20 includes at least one coupon pool 50 for storing coupons that have been submitted to, but failed to validate against an item scanned by, one of the SCO stations 100. As is shown, a customer 70 and an item manufacturer 80 can access the retailer server 20 via a network 60, such as the Internet. This access will be described in more detail below.

Figure 2:
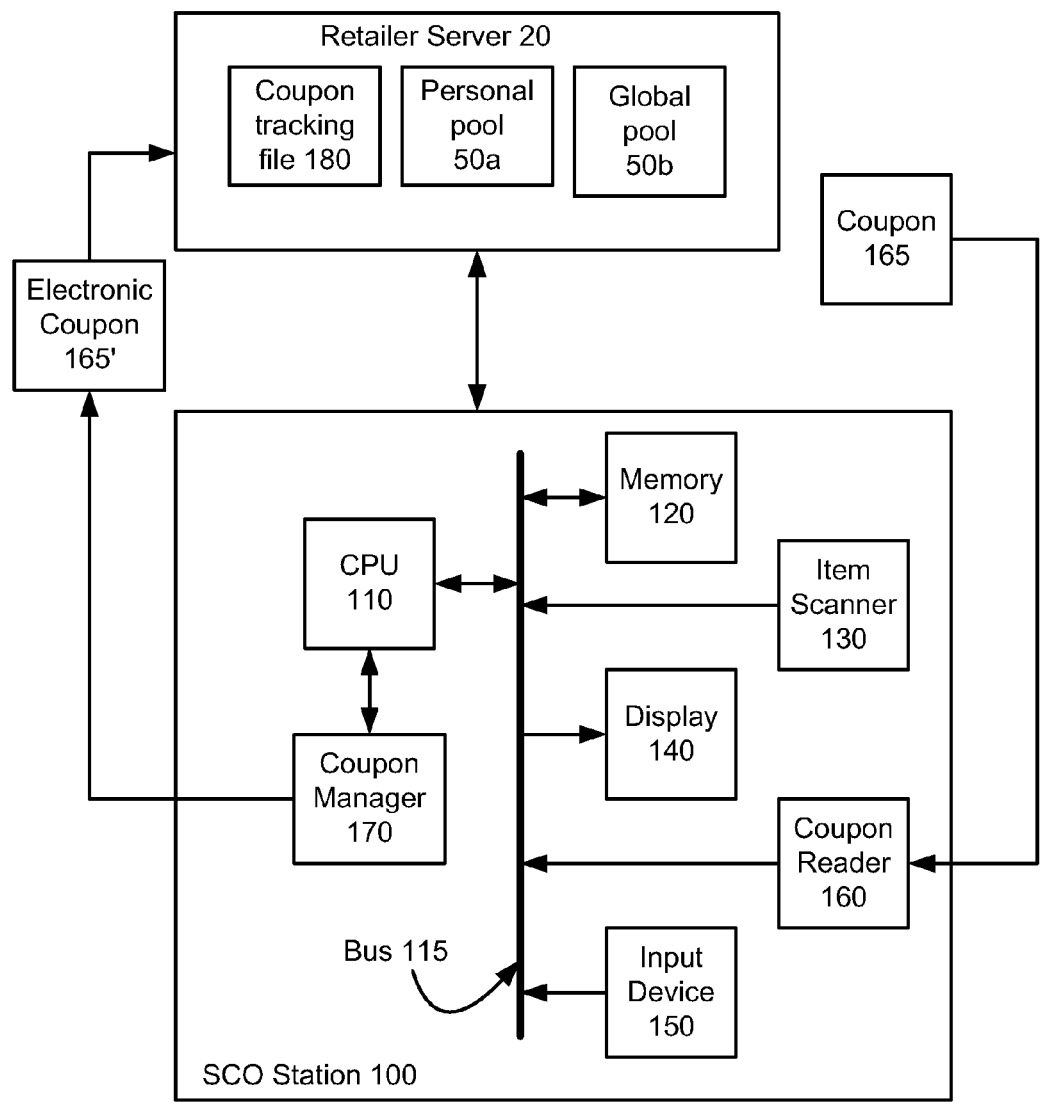
FIG. 2 is a block diagram detailing a Self Check Out station according to a preferred embodiment of the present invention.

FIG. 2 is a block diagram detailing a SCO station 100 according to a preferred embodiment of the present invention. Here, the station 100 includes a central processing unit (CPU) 110 in communication with a plurality of devices 120-160 via a communication bus 115, or some other similar means well known in the art. The plurality of devices includes, but is not limited to, a memory device 120, an item scanner 130, a display 140, an input device 150, and a coupon reader 160. While one input device 150 is depicted, those skilled in the art appreciate that several input devices can be implemented, such as a keyboard, a mouse, and a microphone. Moreover, the input device 150 can be integrated with the display 140 as a "touch-screen" type of input device 150.

During operation, the CPU 110 receives data about an item from the item scanner 130, which it then stores in the memory device 120. Instructional information is displayed to the customer via the display 140, and the customer is able to input information associated with a sales transaction through the input device 150.

According to a preferred embodiment of the present invention, the SCO station 110 also includes a coupon reader 160, which is capable of receiving a paper coupon 165 submitted by a customer and of reading the information on the coupon 165, e.g., a barcode. The data collected by the coupon reader 160 is transmitted to a coupon manager 170 coupled to the CPU 110. The coupon manager 170 processes the coupon 165 and determines if the coupon is viable, e.g., whether the coupon has expired, etc. If appropriate, the coupon manager 170 converts the coupon 165 into an electronic coupon 165' and transmits the electronic coupon 165' to the retailer server 20 where it is stored in a personal pool 50*a* or a global pool 50*b* or both. Simultaneously, the coupon manger 170 collects information about the coupon 165' and stores it in a coupon tracking file 180 in the retailer server 20.

The personal pool 50*a* is preferably associated with the customer such that any coupon 165' stored therein is accessible by the customer only. The global pool 50*b* is a shared pool where the coupons 165' stored therein are available for all shoppers. Those skilled in the art will recognize that other coupon pools can be defined, such as family pools or company pools, and the types of pools should not be limited to those described here.

Figure 3:
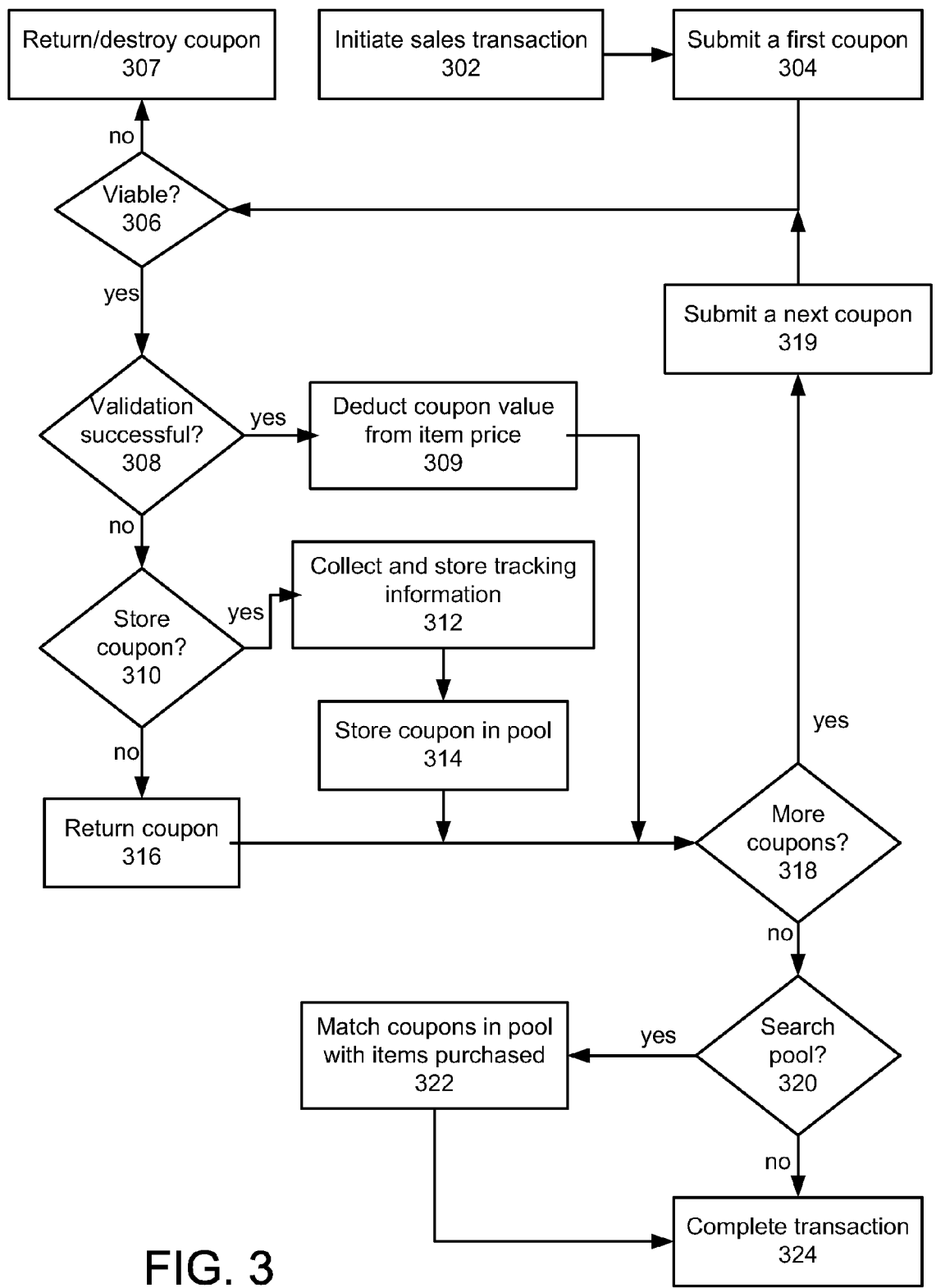
FIG. 3 is a flowchart illustrating a method for managing coupons in a SCO system according to a preferred embodiment of the present invention.

To describe how the coupon manager 170 processes a coupon 165, please refer to FIG. 3, which is a flowchart illustrating a method for managing coupons in a SCO system according to a preferred embodiment of the present invention. The method begins when a customer initiates a sales transaction in step 302. Here, the customer typically presents, e.g., scans, his or her loyalty card, which identifies the customer to the SCO station 110. Then, the customer starts scanning the item(s) for purchase using the item scanner 130. As stated above, the information collected by the item scanner 130 is stored in memory 120.

When the customer has finished scanning all of the items for purchase, the SCO station 110 preferably prompts the customer, e.g., via the display 140 or a speaker (voice prompt), to apply any coupons 165 to the sales transaction. In response, the customer submits a first coupon 165 in step 304 by feeding the coupon 165 into the coupon reader 160, which then transmits the coupon 165 to the coupon manager 170. In step 306, the coupon manager 170 determines whether the coupon 165 is viable, e.g., by comparing the expiration date with the present date. If the coupon 165 is not viable, it is destroyed or returned to the customer (step 307). In a preferred embodiment, the coupon manager 170 collects tracking information related to the rejected coupon 165 and stores the tracking information in the coupon tracking file 180 in the retailer server 20.

If the coupon 165 is viable, the coupon manager 170 then determines whether the coupon can be validated against any of the items in the sales transaction (step 308). If the coupon 165 validates against an item, then normal coupon processing occurs in step 309, i.e., the item price is reduced by the value of the coupon. If the coupon 165 does not validate, e.g., because the coupon does not apply to any items in the sales transaction, or the coupon applies to an item, but the number of units of the item does not correspond to the coupon promotion, etc., then in step 310, the customer decides whether to store the unvalidated coupon 165.

If the customer chooses to store the unvalidated coupon 165, the coupon manager 170 converts the paper coupon 165 into an electronic coupon 165' and collects and stores tracking information about the electronic coupon 165' in the coupon tracking file 180 (step 312). The tracking information can include the manufacturer, the item, reason(s) for non-validation, and the pool(s) in which the coupon is stored. This tracking information can be distributed to interested parties, e.g., manufacturers, for purposes of evaluating product promotions and the like.

After the coupon manager 170 has converted the coupon 165 into an electronic coupon 165', the coupon 165 is destroyed. The coupon manager 170 then transmits the electronic coupon 165' to the retailer server 20 where the electronic coupon 165' is stored in a coupon pool 50*a*, 50*b* in step 314. Here, the electronic coupon 165' can be used in subsequent sales transactions by the customer, e.g., if the coupon 165' is stored in the personal pool 50*a*, or by any other shopper, e.g., if the coupon 165' is stored in the global pool 50*b*. If the customer chooses not to store the unvalidated coupon 165, the coupon manager 170 simply returns the paper coupon 165 to the customer in step 316. In a preferred embodiment, the coupon manager 170 collects and stores the tracking information about the coupon 165 before the coupon 165 is returned to the customer. If the customer has more coupons 165 (step 318), the customer submits a next coupon 165 for processing in step 319, and steps 306 through 316 are repeated.

After the customer has submitted all of his or her coupons 165 (step 318), the coupon manager 170 asks the customer whether he or she would like to search the coupon pool(s) 50*a*, 50*b* for unvalidated electronic coupons 165' that may be applied to any of the items scanned (step 320). If yes, then the coupon pool(s) 50*a*, 50*b* is searched for coupons 165' that match the items in the sales transaction (step 322). If the customer chooses not to search the coupon pools 50*a*, 50*b*, then the coupon manager 170 returns control to the CPU 110 so that the sales transaction can be completed in step 324, e.g., the CPU 110 totals the sale and the customer is prompted to provide payment.

In another preferred embodiment, the coupon manager 170 can ask the customer whether he or she would like to search the coupon pool(s) 50*a*, 50*b* while the customer is scanning the items in the sales transaction. By performing the search as the items are being scanned, the coupon manager 170 can take advantage of the idle time that is inherent in the SCO process to spawn a separate thread to search for coupons in the coupon pool(s) 50a, 50b that match items as they are being scanned in real time. This approach may optimize the overall throughput of the SCO process.

According to the preferred embodiment of the present invention, unvalidated electronic coupons 165' are stored in coupon pools 50a, 50b at the retailer server 20. Because the retailer server 20 is accessible to customers 70 and item manufacturers 80 via the network 60, such as the Internet, customers 70 and item manufacturers 80 can examine the coupon pools 50a, 50b. This provides benefits to both customers 70 and manufacturers 80.

Figure 4:
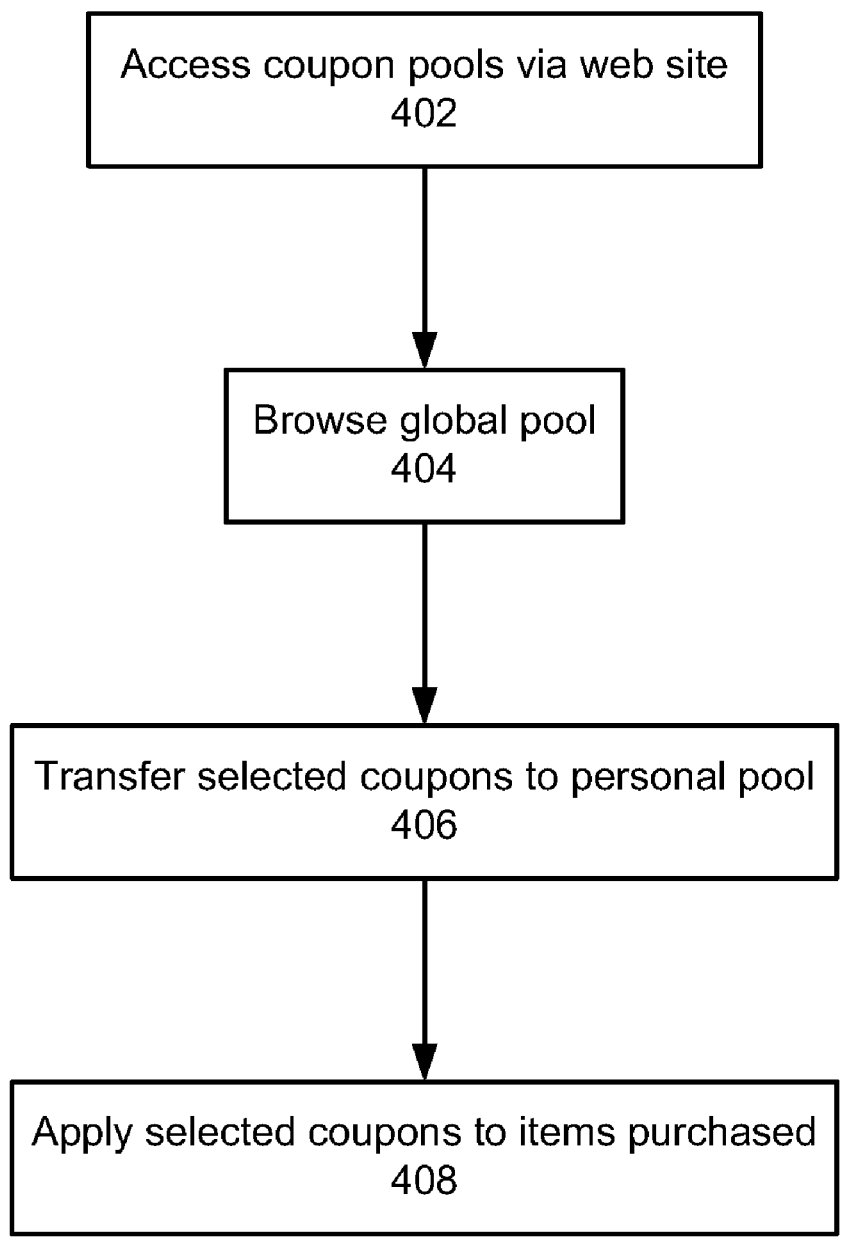
FIG. 4 illustrates a process for utilizing the coupon pools by a customer according to a preferred embodiment of the present invention.

For example, FIG. 4 illustrates a process for utilizing the coupon pools 50a, 50b by a customer 70. In step 402, a customer 70 can access the coupon pools 50a, 50b via the retailer's web site, browse the electronic coupons 165' stored in the global pool 50b (step 404), and in step 406, transfer selected coupons 165' to his or her personal pool 50a before visiting the retailer's store. Once the customer visits the store and scans selected items, the electronic coupons 165' stored in his or her personal pool 50a can be used in step 408. By transferring selected coupons 165' to his or her personal pool 50a, the customer is not required to carry paper coupons and a search of the global pool 50b is avoided during the SCO process, thereby saving time.

For manufacturers 80, valuable information about customer preferences and product management can be gleaned from the contents of the global pool 50b. For instance, an item manufacturer 80 can monitor the popularity of an item based on the rate at which a coupon 165' for that item is transferred out of the global pool 50b. Based on that information, the manufacturer can readjust the coupon value and/or expiration date. Moreover, because the coupons 165' are now electronic, the manufacturer can modify the coupon 165', e.g., extend an expiration date or change a value, through well known web service technology.

In another preferred embodiment, the manufacturer 80 can utilize the information gleaned from the global pool 50b to price the item "on-the-fly." For example, the number and value and expiration date of the coupons 165' for an item in the global pool 50b may be used with other factors, e.g., quantity on hand, item movement data, competitor's pricing, current and planned promotions, to ultimately derive a price in real time. Thus, if the global pool 50b contains a large number of coupons 165' for an item, there may be no need to drastically reduce the price in order to provide an incentive to sell the item. On the other hand, if the global pool 50b contains a small number of the coupons 165' for an item, then the manufacturer may decrease the selling price as an incentive to sell the item. This price can then be implemented immediately via electronic shelf labels (ESLs).

The information gleaned from the global pool 50b can be supplemented by the information stored in the coupon tracking file 180. In a preferred embodiment, the coupon tracking file can be distributed to the item manufacturer 80 periodically so that it can analyze the information to discern patterns of use. For example, if a large number of coupons for an item were rejected because they were fraudulent, the item manufacturer 80 can take action to stop the improper reproduction of the fraudulent coupons. In another example, if a large number of coupons were rejected because they had expired, the item manufacturer 80 might decide to extend the expiration date.

Through aspects of the present invention, a system and method for processing coupons that fail to validate in a sales transaction at an SCO station is disclosed. If a coupon fails to validate, i.e., it cannot be applied to any items purchased by the customer, the customer has the option to store the coupon in a pool of unused coupons. The coupons in the pool can then be used by the customer or any other shopper in subsequent sales transactions. During the sales transaction, a search of the pool of unused coupons can be performed to match the items in the sales transaction.

Although the present invention has been described in accordance with the embodiment shown, one of ordinary skill in the art will readily recognize that there could be variations to the embodiment and those variations would be within the spirit and scope of the present invention. Accordingly, many modifications may be made by one of ordinary skill in the art without departing from the spirit and scope of the appended claims.

What is claimed is:

1. A self checkout system comprising:
a server; and
at least one self checkout station coupled to the server, wherein the at least one self checkout station comprises:
a scanner for scanning at least one item for purchase by a customer;
a coupon reader for receiving a coupon from the customer, wherein the coupon is a paper coupon that is fed into a coupon reader of the at least one self checkout stations; and
a coupon manager for validating the coupon against the at least one item scanned by the customer, wherein the coupon manager is operable to:
allows the customer to choose whether to store the coupon that has not been validated against the at least one item scanned by the customer;
if the customer chooses to store the coupon that has not been validated against the at least one item scanned by the customer, convert the paper coupon into an electronic coupon;
collect tracking information related to the coupon and storing the tracking information in a file at the server;
transmit the electronic coupon from the one self checkout station to the server;
destroy the paper coupon after the paper coupon has been converted into an electronic coupon;
store the electronic coupon into one of two coupon pools at the server if the coupon fails to validate against the at least one item, wherein one coupon pool is a global pool having coupons stored in the global pool are accessible by all customers, wherein the other coupon pool is a personal pool that is associated with the customer such that coupons stored in the personal pool are accessible only by the customer, wherein the tracking information comprises the coupon pool in which the coupon is stored, wherein the stored electronic coupon can be utilized at a subsequent sales transaction, wherein the global pool allows the second customer to search the global pool for a coupon that validates against an item scanned by the second customer during the subsequent sales transaction, wherein the global pool allows a second customer in the subsequent sales transaction to utilize the coupon, wherein a value of the coupon is deducted from a price of the item if the coupon and the item are validated, and wherein the personal pool allows the customer to access the global pool, select at least one coupon in the global pool, and transfer the selected coupon to a personal account at the server; and
allow the customer to search one or more of the global pool and the personal pool for coupons that can be applied to any scanned items by the customer.

2. The self checkout system of claim 1 wherein the coupon manager is further operable to:

receive the tracking information in the file by an item manufacturer;

access the global pool at the server by the item manufacturer;

select at least one coupon in the global pool;

analyze the tracking information for the selected coupon;

modify the selected coupon by modifying a price of the item based on the analysis and by modifying an expiration date of the selected coupon; and implement the modified price immediately via an electronic shelf label associated with the item.

3. A computer-readable storage medium including program instructions for processing coupons by a self-checkout system, the program instructions which when executed by a computer system cause the computer system to execute a method comprising:

receiving a coupon from a customer, wherein the coupon is a paper coupon that is fed into a coupon reader of the at least one self-checkout stations;

attempting to validate the coupon against at least one item scanned by the customer;

allowing the customer to choose whether to store the coupon that has not been validated against the at least one item scanned by the customer;

if the customer chooses to store the coupon that has not been validated against the at least one item scanned by the customer, converting the paper coupon into an electronic coupon; collecting tracking information related to the coupon and storing the tracking information in a file at the server;

transmitting the electronic coupon from the one self-checkout station to the server, destroying the paper coupon after the paper coupon has been converted into an electronic coupon;

storing the electronic coupon into one of two coupon pools at the server if the coupon falls to validate against the at least one item, wherein one coupon pool is a global pool having coupons stored in the global pool are accessible by all customers, wherein the other coupon pool is a personal pool that is associated with the customer such that coupons stored in the personal pool are accessible only by the customer, wherein the tracking information comprises the coupon pool in which the coupon is stored, wherein the stored electronic coupon can be utilized at a subsequent sales transaction, wherein the global pool allows the second customer to search the global pool for a coupon that validates against an item scanned by the second customer during the subsequent sales transaction, wherein the global pool allows a second customer in the subsequent sales transaction to utilize the coupon, wherein a value of the coupon is deducted from a price of the item if the coupon and the item are validated, and wherein the personal pool allows the customer to access the global pool, select at least one coupon in the global pool, and transfer the selected coupon to a personal account at the server;

allowing the customer to search one or more of the global pool and the personal pool for coupons that can be applied to any scanned items by the customer.

4. The computer-readable medium of claim 3 further comprising program instructions for:

receiving the tracking information in the file by an item manufacturer;

accessing the global pool at the server by the item manufacturer;

selecting at least one coupon in the global pool;

analyzing the tracking information for the selected coupon;

modifying the selected coupon by modifying a price of the item based on the analysis and by modifying an expiration date of the selected coupon; and implementing the modified price immediately via an electronic shelf label associated with the item.

* * * * *